United States Patent
Volbers

(10) Patent No.: US 12,407,199 B2
(45) Date of Patent: Sep. 2, 2025

(54) LAMINATED CORE WITH SEGMENTS AND LAMINATION WELDED TOGETHER, LAMINATIONS MADE FROM FeSi ALLOY AND CoFe ALLOY

(71) Applicant: Vacuumschmelze GmbH & Co. KG, Hanau (DE)

(72) Inventor: Niklas Volbers, Bruchköbel (DE)

(73) Assignee: Vacuumschmelze GmbH & Co. KG, Hanau (DE)

( * ) Notice: Subject to any disclaimer, the term of this patent is extended or adjusted under 35 U.S.C. 154(b) by 257 days.

(21) Appl. No.: 17/488,903

(22) Filed: Sep. 29, 2021

(65) Prior Publication Data

US 2022/0109335 A1   Apr. 7, 2022

(30) Foreign Application Priority Data

Oct. 2, 2020  (DE) .......................... 102020125897.6

(51) Int. Cl.
*H02K 1/14* (2006.01)
*H01F 3/02* (2006.01)
*H01F 27/245* (2006.01)
*H01F 27/26* (2006.01)

(52) U.S. Cl.
CPC .............. *H02K 1/148* (2013.01); *H01F 3/02* (2013.01); *H01F 27/245* (2013.01); *H01F 27/263* (2013.01)

(58) Field of Classification Search
CPC ............ H02K 1/14; H02K 1/146; H02K 1/16; H02K 1/148; H02K 1/08; H02K 1/06; H02K 15/02; H02K 15/022; H02K 15/026; H02K 2201/09; H02K 1/165; H02K 29/03; H02K 21/14; H02K 2213/03
USPC ...... 310/216.004, 216.011–216.019, 216.059, 310/216.061, 216.062, 216.064, 216.065, 310/216.071, 216.073, 216.092, 216.096
See application file for complete search history.

(56) References Cited

U.S. PATENT DOCUMENTS

| | | | |
|---|---|---|---|
| 4,213,792 A | 7/1980 | Marianeschi | |
| 4,316,111 A * | 2/1982 | Merki | H02K 3/527 310/216.136 |
| 5,231,337 A * | 7/1993 | van Namen | H02K 33/18 318/128 |
| 6,323,568 B1 * | 11/2001 | Zabar | F04B 17/042 310/12.24 |
| 7,671,493 B2 * | 3/2010 | Takashima | G06F 3/016 310/15 |
| 7,999,421 B2 * | 8/2011 | Kim | H02K 33/18 310/15 |

(Continued)

FOREIGN PATENT DOCUMENTS

| | | |
|---|---|---|
| DE | 2810155 A1 | 9/1978 |
| DE | 69109794 T2 | 2/1996 |

(Continued)

*Primary Examiner* — Maged M Almawri
(74) *Attorney, Agent, or Firm* — Dickinson Wright PLLC

(57) ABSTRACT

A laminated core comprising a plurality of segments is provided. The segments each comprise a plurality of soft magnetic lamination sheets that are stacked one on top of another in a direction of stacking and attached to one another by means of a first connection type to form a segment. The segments are attached by means of a second connection type to form a laminated core, the first and second connection types being different.

11 Claims, 6 Drawing Sheets

(56) References Cited

U.S. PATENT DOCUMENTS

| | | | | |
|---|---|---|---|---|
| 8,269,379 B2* | 9/2012 | Dong | H02K 33/16 | 310/28 |
| 8,278,786 B2* | 10/2012 | Woo | H02K 33/16 | 310/15 |
| 8,368,268 B2* | 2/2013 | Hasegawa | G02B 21/248 | 359/381 |
| 8,648,502 B2* | 2/2014 | Park | H02K 33/16 | 310/15 |
| 8,829,741 B2* | 9/2014 | Park | B06B 1/045 | 310/25 |
| 8,878,401 B2* | 11/2014 | Lee | H02K 33/16 | 310/15 |
| 8,887,376 B2* | 11/2014 | Gerster | H01F 41/024 | 29/598 |
| 8,941,272 B2* | 1/2015 | Hong | H02K 33/18 | 310/15 |
| 8,943,677 B2 | 2/2015 | Gerster et al. | | |
| 9,024,489 B2* | 5/2015 | Akanuma | H02K 33/16 | 310/15 |
| 9,225,265 B2* | 12/2015 | Oh | G06F 3/016 | |
| 9,306,429 B2* | 4/2016 | Akanuma | H02K 33/16 | |
| 9,543,816 B2* | 1/2017 | Nakamura | H02K 33/16 | |
| 9,748,827 B2* | 8/2017 | Dong | H02K 33/16 | |
| 9,948,170 B2* | 4/2018 | Jun | H02K 33/00 | |
| 10,033,257 B2* | 7/2018 | Zhang | H02K 33/12 | |
| 10,063,128 B2* | 8/2018 | Wang | H02K 33/16 | |
| 10,160,010 B2* | 12/2018 | Chun | H02K 33/16 | |
| 10,307,791 B2* | 6/2019 | Xu | B06B 1/045 | |
| 10,328,461 B2* | 6/2019 | Xu | B06B 1/045 | |
| 10,447,133 B2* | 10/2019 | Jin | H02K 33/16 | |
| 10,483,451 B2* | 11/2019 | Wang | H10N 30/01 | |
| 10,486,196 B2* | 11/2019 | Chai | B06B 1/045 | |
| 10,491,090 B2* | 11/2019 | Zu | H02K 33/16 | |
| 10,547,233 B2* | 1/2020 | Jin | H02K 5/04 | |
| 10,596,594 B2* | 3/2020 | Ling | H02K 33/02 | |
| 10,596,596 B2* | 3/2020 | Ling | H04R 9/066 | |
| 10,674,278 B2* | 6/2020 | Zhou | H04R 9/025 | |
| 10,763,732 B2* | 9/2020 | Liu | H02K 33/18 | |
| 10,886,827 B2* | 1/2021 | Liu | H02K 33/14 | |
| 11,050,334 B2* | 6/2021 | Mori | H02K 33/18 | |
| 11,205,937 B2* | 12/2021 | Song | H02K 41/0354 | |
| 11,261,513 B2* | 3/2022 | Volbers | H01F 1/16 | |
| 11,309,808 B1* | 4/2022 | Li | H02K 35/02 | |
| 11,522,429 B2* | 12/2022 | Takahashi | H02K 33/16 | |
| 11,705,625 B2* | 7/2023 | Tezuka | H01Q 1/48 | 343/700 R |
| 11,949,308 B2* | 4/2024 | Shao | H02K 33/02 | |
| 11,984,784 B2* | 5/2024 | Hatano | H02K 33/02 | |
| 12,009,719 B2* | 6/2024 | Maeda | B06B 1/045 | |
| 2002/0145359 A1* | 10/2002 | Nishiyama | H02K 15/022 | 310/216.065 |
| 2002/0175586 A1* | 11/2002 | Hill | H02K 19/103 | 310/179 |
| 2004/0169425 A1* | 9/2004 | Aihara | B06B 1/045 | 310/15 |
| 2006/0066164 A1* | 3/2006 | Kim | H02K 7/063 | 310/81 |
| 2006/0133218 A1* | 6/2006 | Matthey | B06B 1/045 | 368/230 |
| 2007/0209175 A1 | 9/2007 | Blocher et al. | | |
| 2009/0096299 A1* | 4/2009 | Ota | B06B 1/045 | 310/25 |
| 2009/0267423 A1* | 10/2009 | Kajiwara | H02K 33/02 | 310/38 |
| 2010/0045120 A1* | 2/2010 | Kitano | B22F 1/102 | 252/62.51 R |
| 2010/0213773 A1* | 8/2010 | Dong | H02K 33/16 | 310/25 |
| 2010/0302752 A1* | 12/2010 | An | H02K 33/06 | 361/807 |
| 2011/0006618 A1* | 1/2011 | Lee | H02K 33/16 | 310/25 |
| 2011/0018364 A1* | 1/2011 | Kim | H02K 33/18 | 310/20 |
| 2011/0037338 A1* | 2/2011 | Leiber | H02K 15/022 | 310/216.105 |
| 2011/0068640 A1* | 3/2011 | Choi | H02K 5/04 | 310/25 |
| 2011/0089772 A1* | 4/2011 | Dong | H02K 33/16 | 310/25 |
| 2011/0115311 A1* | 5/2011 | Dong | H02K 33/16 | 310/28 |
| 2011/0133577 A1* | 6/2011 | Lee | H02K 33/18 | 310/15 |
| 2011/0156500 A1* | 6/2011 | Dong | H02K 33/16 | 310/25 |
| 2011/0198945 A1* | 8/2011 | Nakagawa | H02K 33/16 | 310/12.25 |
| 2011/0254782 A1* | 10/2011 | Park | H02K 33/04 | 345/173 |
| 2011/0266892 A1* | 11/2011 | Wauke | H02K 33/18 | 310/25 |
| 2011/0316361 A1* | 12/2011 | Park | H02K 33/16 | 310/25 |
| 2012/0153748 A1* | 6/2012 | Wauke | H02K 33/16 | 310/25 |
| 2012/0156441 A1 | 6/2012 | Gerster et al. | | |
| 2012/0169148 A1* | 7/2012 | Kim | H02K 33/16 | 310/25 |
| 2012/0187780 A1* | 7/2012 | Bang | H02K 33/16 | 310/25 |
| 2012/0313459 A1* | 12/2012 | Zhang | H02K 33/18 | 310/25 |
| 2013/0061736 A1* | 3/2013 | Wauke | G10H 1/42 | 84/736 |
| 2013/0099600 A1* | 4/2013 | Park | B06B 1/045 | 310/15 |
| 2013/0099602 A1* | 4/2013 | Park | H02K 33/16 | 310/25 |
| 2014/0035397 A1* | 2/2014 | Endo | H02K 33/18 | 310/30 |
| 2014/0070999 A1* | 3/2014 | Kaneda | H01L 24/14 | 257/E21.705 |
| 2014/0084742 A1* | 3/2014 | Gudewer | H02K 1/08 | 310/216.091 |
| 2014/0167894 A1* | 6/2014 | Jajtic | H02K 1/02 | 335/297 |
| 2015/0137627 A1* | 5/2015 | Katada | H02K 33/16 | 310/25 |
| 2015/0137628 A1* | 5/2015 | Endo | H02K 33/16 | 310/25 |
| 2015/0194870 A1* | 7/2015 | Kim | H02K 33/18 | 310/25 |
| 2016/0164389 A1* | 6/2016 | Jang | H02K 7/116 | 310/20 |
| 2016/0173990 A1* | 6/2016 | Park | H04R 9/043 | 381/354 |
| 2016/0218607 A1* | 7/2016 | Oh | H02K 33/16 | |
| 2017/0019011 A1* | 1/2017 | Wang | H02K 33/16 | |
| 2017/0033653 A1* | 2/2017 | Wang | H02K 33/16 | |
| 2017/0033657 A1* | 2/2017 | Mao | H02K 33/16 | |
| 2017/0033669 A1* | 2/2017 | Xu | H02K 33/16 | |
| 2017/0047829 A1 | 2/2017 | Hasuo | | |
| 2017/0104401 A1* | 4/2017 | Umehara | H02K 33/16 | |
| 2017/0110920 A1* | 4/2017 | Mao | H02K 1/34 | |
| 2017/0214306 A1* | 7/2017 | Katada | H02K 33/16 | |
| 2017/0229929 A1 | 8/2017 | Fahrenbach | | |
| 2017/0250581 A1 | 8/2017 | Bauer et al. | | |
| 2017/0288519 A1* | 10/2017 | Kim | H02K 33/16 | |
| 2017/0310170 A1 | 10/2017 | Rist et al. | | |
| 2017/0338724 A1 | 11/2017 | Arakawa et al. | | |
| 2017/0346351 A1* | 11/2017 | Volbers | H02K 1/02 | |
| 2018/0021812 A1* | 1/2018 | Akanuma | H02K 33/00 | 310/25 |
| 2018/0026501 A1* | 1/2018 | Ogikubo | H02K 15/022 | 29/596 |
| 2018/0166951 A1* | 6/2018 | Ronning | C09K 5/14 | |
| 2018/0241295 A1* | 8/2018 | Zu | H02K 33/14 | |
| 2018/0250107 A1* | 9/2018 | Dai | H02K 1/2791 | |

(56) References Cited

U.S. PATENT DOCUMENTS

| | | | |
|---|---|---|---|
| 2018/0297074 A1* | 10/2018 | Huang | B06B 1/045 |
| 2019/0044425 A1* | 2/2019 | Zu | H02K 33/02 |
| 2019/0151895 A1* | 5/2019 | Takahashi | B06B 1/045 |
| 2019/0181731 A1* | 6/2019 | Yoshinaga | H02K 1/02 |
| 2019/0206601 A1* | 7/2019 | Wauke | H01F 7/0289 |
| 2020/0112210 A1* | 4/2020 | Zhu | H02K 1/2766 |
| 2020/0136488 A1* | 4/2020 | Takahashi | H02K 33/16 |
| 2020/0161944 A1* | 5/2020 | Das | H02K 15/022 |
| 2020/0318212 A1 | 10/2020 | Fohr et al. | |
| 2020/0325564 A1 | 10/2020 | Fohr et al. | |
| 2020/0366177 A1* | 11/2020 | Maeda | H02K 33/02 |
| 2020/0381962 A1* | 12/2020 | Georgiou | H02K 1/148 |
| 2021/0067021 A1* | 3/2021 | Maeda | H02K 33/16 |
| 2021/0091611 A1* | 3/2021 | Volbers | H02K 3/18 |
| 2021/0194342 A1* | 6/2021 | Kitahara | H02K 33/18 |
| 2021/0351658 A1* | 11/2021 | Jore | H02K 5/203 |
| 2021/0399594 A1* | 12/2021 | Fujimura | H02K 1/146 |
| 2022/0006334 A1* | 1/2022 | Wakisaka | H02K 15/028 |
| 2022/0028608 A1* | 1/2022 | Kamikawabata | H01F 41/0233 |
| 2022/0045582 A1* | 2/2022 | Hunstable | H02K 15/08 |
| 2022/0123645 A1* | 4/2022 | Ohishi | H02K 35/02 |
| 2023/0198366 A1* | 6/2023 | Tsuchihashi | H02K 33/18 310/28 |

FOREIGN PATENT DOCUMENTS

| | | |
|---|---|---|
| DE | 102006055264 A1 | 5/2008 |
| DE | 102012213239 A1 | 1/2014 |
| DE | 102014111239 A1 | 2/2016 |
| DE | 102014222655 A1 | 5/2016 |
| DE | 102016005329 A1 | 10/2017 |
| DE | 102017208719 A1 | 11/2017 |
| DE | 102018112493 A1 | 5/2019 |
| EP | 0480265 B1 | 4/1992 |
| EP | 1833145 A2 | 9/2007 |
| EP | 2222805 B1 | 9/2010 |
| EP | 2362523 B1 | 8/2011 |
| EP | 3175539 B1 | 6/2017 |
| GB | 2480958 B | 12/2011 |
| GB | 2553873 A | 3/2018 |
| JP | 2007282392 A | 10/2007 |
| JP | 2019033618 A1 | 2/2019 |
| WO | 2009079540 A1 | 6/2009 |
| WO | 2010109272 A2 | 9/2010 |

* cited by examiner

LAMINATED CORE WITH SEGMENTS AND LAMINATION WELDED TOGETHER, LAMINATIONS MADE FROM FeSi ALLOY AND CoFe ALLOY

This U.S. patent application claims priority to DE Patent Application No. 10 2020 125 897.6, filed Oct. 2, 2020, the entire contents of which is incorporated herein by reference in its entirety.

BACKGROUND

1. Technical Field

The present invention relates to a laminated core, an electric machine and a method for producing a laminated core.

2. Related Art

In most designs, electric machines comprise a stator made of a soft magnetic material. This stator may consist of a solid material. In some designs, the stator is made of single or lamination sheets that are stacked one on top of another to form a so-called laminated core. The function of these sheets is to conduct magnetic flux in the sheet plane. High magnetic conductivity (permeability) of the material and the ability to carry the highest possible flux density (induction) are advantageous in that they increase the performance of the stator. The materials used for laminated cores for stators are predominantly made of silicon-iron (SiFe), i.e. Fe with the addition of 2 to 4 wt % (Si+Al). In applications in which maximum power density is required or desired, materials made of cobalt-iron (CoFe) are also used.

In addition to the choice of material, however, the performance of the stator and so of the entire electric machine is also influenced by the manufacturing process used. The individual sheets can be produced using various methods including, for example, punching, laser cutting, waterjet cutting and electric discharge machining, for example. The sheets can also be joined to form the stator by a plurality of methods including, for example, the application of a continuous laser weld seam, as disclosed in US 2017/047829 A1, or by adhesive bonding, as disclosed in EP 1 833 145 A2. There are also methods in which the sheets are joined in the die itself, as in in-die stacking, for example, in which the sheets are stamped or punched and then stacked.

The object is therefore to provide a stator with good performance that is simpler and more reliable to assemble.

SUMMARY

According to the invention, a laminated core comprising a plurality of segments is provided. The segments each have a plurality of soft magnetic lamination sheets that are stacked one on top of another in a direction of stacking and attached by means of a first connection type to form a segment. The segments are attached by means of a second connection type to form a laminated core, the first and second connection types being different.

The laminated core as a whole is not therefore assembled and joined. Instead, a plurality of segments is first produced from a small number of sheets, and these segments are attached to one another to form a laminated core. The type of connection that connects the lamination sheets to one another to form the segments themselves is different to the type of connection that is used to connect the segments to one another. This combination of two different connection types in one laminated core can be used to produce laminated cores from thin soft magnetic lamination sheets in such a manner that the soft magnetic properties of the basic material are maintained as far as possible. This increases the performance of the laminated core and guarantees a clear reduction in the effort required to place very thin lamination sheets one on top of another by grouping them in one pre-assembled segment.

These pre-assembled segments are easy to handle and it is therefore easier to avoid further damage to the lamination sheets and so further impairment of their magnetic properties. The segment therefore serves as an intermediate product. Impairment of the soft magnetic properties is also minimised by the connection process used to form the laminated core from the individual segments as the second connection type is applied to only a very small number of these thin sheets.

The majority of lamination sheets of a segment is attached in the segment by the first connection type only. Only lamination sheets of different segments that are attached to one another are attached by means of the second connection type. For example, only the topmost and/or bottommost lamination sheets of a segment are attached by means of the second connection type.

In some embodiments, these easy-to-handle segments are annealed to adjust and set the magnetic properties of the basic material. The annealed segments are then attached to form a laminated core. The first connection type is thus chosen to be thermally stable under the annealing conditions used. A welded connection such as a weld seam, for example, can be used as the first connection type. The second connection type may be more temperature sensitive and an adhesive, for example, may be used as the second connection type. The second connection, e.g. adhesive bonding, is made between as few sheets as possible and over the smallest surface area possible in order to avoid stressing the material. As a result, the magnetic properties of the annealed segments are maintained or only slightly affected even after they have been attached to form the laminated core.

In one embodiment, the laminated core comprises a plurality of segments, the segments each comprising a plurality of soft magnetic lamination sheets that are stacked one on top of another in a direction of stacking and attached to one another by means of a welded connection to form a segment. The segments each have end faces and these end faces are attached to one another by an adhesive connection to form a laminated core.

The end faces have a lateral area that extends substantially perpendicularly to the direction of stacking. Each end face may be formed by the major surface of an outermost one of the soft magnetic sheets of the segment. Each segment may comprise two ends faces that oppose one another and face is opposite directions.

In some embodiments, the welded connection takes the form or one or more spots or seams.

In some embodiment, the welded connection takes the form of one or more spots or seams that are arranged on edge sides of the lamination sheets The method according to the invention is particularly suited to the production of a laminated core from thin lamination sheets, for example lamination sheets with a thickness of 0.05 mm to 0.5 mm, preferably 0.1 mm to 0.35 mm, preferably 0.1 mm to 0.2 mm.

The method according to the invention can be used to produce laminated cores made of different materials such as 50% CoFe (e.g. VACODUR 49) and 3% SiFe (e.g. TRAFOPERM N4), or laminated cores made from one type of material.

After carrying out the following analysis, the inventors have established the following disadvantages of the different connection types in the production of laminated cores. These findings have led the inventors to use one connection type inside a segment and another connection type between the segments of a laminated core in order to provide a laminated core with improved performance that is also easier to produce, in particular in industrial processes and industrial quantities.

One approach to the production of laminated cores from a single material is to place the sheets on top of one another and weld them externally, i.e. by making one or more laser weld seams that join the edge sides of the lamination sheets to one another. Since this results in the fusing of the material and, locally, to a change in structure, the soft magnetic properties of the material deteriorate. The material therefore undergoes final annealing following the fusion process. With laminated cores made from a single material this generally results in a recovery of these properties.

However, if this approach is transposed to the production of laminated cores from two different materials A and B, i.e. lamination sheets made of these materials are first stacked alternately, connected to one another by means of a laser weld seam and then subjected to magnetic final annealing, it is found that the soft magnetic properties can deteriorate significantly.

The inventors have established that it is not the number of weld seams in itself that is relevant since the effects of this material damage are relatively minor and the damaged structure in the region of the weld can for the most part be repaired by the subsequent final annealing. In fact, it is the number of welds between different materials that is critical in the deterioration of the soft magnetic properties of the laminated core. This is possibly due to the different expansion behaviours of the materials during cooling after welding, but also after the annealing process, which results in internal stresses in the materials at room temperature.

As a consequence, in this invention the number of weld seams between different materials is reduced as much as possible or, preferably, avoided completely. For example, the segments, in particular segments made of different materials, are not connected to one another by means of weld seams.

An alternative approach to the joining of laminations to form a core is to bond the sheets adhesively to one another. This, too, necessarily results in stresses in the material since the purpose of the adhesive is to fix the sheets together. These stresses also adversely affect magnetic properties. In contrast to a welding process followed by annealing, the adhesive bonding process is also disadvantageous for laminated cores made of a single material. As a result, the number of adhesion points generally has to be minimised.

According to the invention, these welding and adhesive bonding techniques can be combined in order to reduce the number of connection points and to adapt the connection types to the requirements of the joint. For example, the lamination sheets are attached by means of welding to form a segment so that the segment can be annealed. Adhesive can then be used to connect the annealed segments to one another. The second connection type no longer needs to be used between each pair of lamination sheets, only between the segments.

In one embodiment, a subset of sheets is first welded together to form an easy-to-handle segment. The segment is annealed to set its magnetic properties. A plurality of these segments is then joined by adhesive bonding to form a laminated core.

In some embodiments, the segments each have end faces and these end faces are attached to one another by the second connection type, for example bonding. This embodiment can be used to increase the height of the laminated core by stacking segments one on top of another.

In some embodiments, the lamination sheets of a segment each have an edge side, and the first connection type is arranged on the edge sides. Here, the first connection type is a welded connection, for example.

In some embodiments, the welded connection takes the form or one or more seams that are arranged on edge sides of the lamination sheets to form the segment. Since it is formed of the basic material of the lamination sheet, a welded connection is temperature-stable and can therefore be annealed.

In some embodiments, the second connection type is an adhesive bonding connection. An epoxy resin might be used as the adhesive.

For example, the adhesive connection may have a plurality of adhesive spots or the adhesive connection may extend over almost the entire boundary between the segments. These adhesive spots or the extensive layer can be applied to the end face of one of the segments to be connected.

In some embodiments, the first connection type is a welded connection and the second connection type is an adhesive connection. In some embodiments, the lamination sheets are attached by at least one welded connection on the edge side to form a segment, and the end faces of the segment are attached to one another by an adhesive connection in order to form the laminated core from the segments.

In one embodiment, the lamination sheets of the segments of a laminated core are made of the same soft magnetic alloy such that the finished laminated core is formed of one soft magnetic alloy. Alternatively, the segments of a laminated core may be made of different soft magnetic alloys. In this case, the individual segments are made of one soft magnetic alloy, while the laminated core is composed of segments made of different soft magnetic alloys.

In one embodiment, at least one segment of the plurality of segments may comprise lamination sheets made of a soft magnetic alloy that is different from the soft magnetic alloy of the lamination sheets in the other segments.

In one embodiment, the laminated core comprises lamination sheets made of different soft magnetic alloys, and within the segments all lamination sheets are made of the same soft magnetic alloy.

In one embodiment, at least one segment is formed of lamination sheets of an FeSi alloy and at least one segment is formed of lamination sheets of a CoFe alloy.

For example, the FeSi alloy may comprise
an FeSi-based alloy with 1 to 4.5 wt % of at least one element from the group consisting of Si and Al, the rest being Fe and unavoidable impurities.

For example, the CoFe alloy may comprise
a CoFe-based alloy with 35 to 55 wt % Co and up to 2.5 wt % V, the rest being Fe and unavoidable impurities, or
a CoFe-based alloy with 45 wt %≤Co≤52 wt %, 45 wt %≤Fe≤52 wt %, 0.5 wt %≤V≤2.5 wt %, the rest being Fe and unavoidable impurities, or a CoFe-based alloy with 35 wt %≤Co≤55 wt %, preferably 45 wt %≤Co≤52 wt %, 0 wt %≤Ni≤0.5 wt %, 0.5 wt %≤V≤2.5 wt %, the rest being Fe and unavoidable impurities, or a CoFe-based alloy with 35 wt %≤Co≤55 wt %, 0 wt %≤V≤2.5 wt %, 0 wt %≤(Ta+2Nb)≤1 wt %, 0 wt %≤Zr≤1.5 wt %, 0 wt %≤Ni≤5 wt %, 0 wt %≤C≤0.5 wt %, 0 wt %≤Cr≤1 wt %, 0 wt %≤Mn≤1 wt %, 0 wt %≤Si≤1 wt %, 0 wt %≤Al≤1 wt %, 0 wt %≤B≤0.01 wt %, the rest being Fe and unavoidable impurities, or a CoFe-based alloy with 5 to 25 wt % Co, 0.3 to 5.0 wt % V, 0 wt %≤Cr≤3.0 wt %, 0 wt %≤Si≤3.0 wt %, 0 wt %≤Mn≤3.0 wt %, 0 wt %≤Al≤3.0 wt %, 0 wt %≤Ta≤0.5 wt %, 0 wt %≤Ni≤0.5 wt %, 0 wt %≤Mo≤0.5 wt %, 0 wt %≤Cu≤0.2 wt %, 0 wt %≤Nb≤0.25 wt %, the rest being Fe and unavoidable impurities.

The lamination sheets of the segments may be electrically insulated from one another by an insulating layer. The insulating layer may be an oxide of Mg or Al or Zr. The insulating layer may be arranged on one or both sides of the lamination sheet.

There is also provided an electric machine that has a laminated core according to one of the preceding embodiments and is designed as a stator or a rotor.

A method is also provided for producing a laminated core from a plurality of segments. First of all, the segments are produced by stacking a first plurality of lamination sheets one on top of another in a direction of stacking and attaching the lamination sheets by means of a first connection type. At least two of these segments are attached by means of a second connection type to form a laminated core, the first and second connection types being different.

In some embodiments, the segments are first heat treated or annealed and then attached to form a laminated core.

In some embodiments, the first connection type is welding and the lamination sheets are attached by means of welding to form a segment. A welded connection has the advantage of being more temperature-stable and the segment can therefore be annealed.

In one embodiment, edge sides of the lamination sheets of a segment are attached to one another by one or more weld seams. The one or more weld seams can be formed by means of laser welding.

In one embodiment, a method for producing a laminated core comprises the following: producing a plurality of segments of a laminated core, each segment being produced by stacking a first plurality of lamination sheets one on top of another in a direction of stacking and attaching the lamination sheets by means of a welded connection to form a segment, and attaching at least two segments by means of an adhesive connection to form a laminated core.

In one embodiment, a method for producing a laminated core comprises the following: producing a plurality of segments of a laminated core in order to form a segment, the lamination sheets being formed from a strip by means of in-die stacking, in which the sheets are stamped or punched from the sheet and then stacked to form a segment, and attaching at least two segments by means of an adhesive connection to form a laminated core.

In some embodiments, the lamination sheets are attached by means of a welded connection to form the segment.

In some embodiments, the lamination sheets are attached by means of a recess to form the segment, the recesses of adjacent lamination sheets of the stack engaging with one another.

In one embodiment, the lamination sheets are formed from a strip by means of in-die stacking and stacked to form a segment. With in-die stacking, the first connection type can be a recess, for example a connecting nipple, such that the recesses of adjacent lamination sheet of the stack engage with one another. As such, a mechanical connection is used as the first connection type. In one embodiment, one or more weld seams are used in addition to this mechanical connection to attach the lamination sheets to form a segment.

In a further embodiment, the lamination sheets are formed from a strip by laser in-die stacking and stacked to form a segment. With laser in-die stacking, the first connection type is a spot-welded connection between adjacent laminations positioned one on top of the other. In one embodiment, one or more weld seams are used in addition to this connection to attach the lamination sheets to form a segment.

In some embodiments the second connection type is adhesive bonding. The adhesive may be applied in spots or over a large area to the surfaces to be connected, for example to the end face of a segment formed by an outer lamination sheet.

The adhesive may be applied at a plurality of separate spots on an end face of a segment, and a further segment may be applied to the adhesive spots to attach the two segments to one another by means of a plurality of adhesive connections. Alternatively, the adhesive is applied over a large area to the end face of a segment, and a further segment is applied to the adhesive to attach the two segments to one another by means of a single large area adhesive connection.

In one embodiment, at least one strip of a soft magnetic alloy that is coated with an insulating material is provided. A plurality of lamination sheets is formed from the coated strip. These coated lamination sheets can then be stacked and attached by means of the first connection type to form a segment.

In one embodiment, the lamination sheets are formed from a strip by laser cutting, stacked and attached by means of laser connection points to form a segment.

The strip can be coated with the insulating material by dipping. Dipping is advantageous for coating both sides of a strip simultaneously. It is also possible to coat one or both sides using other processes such as spraying, for example.

In some embodiments, the lamination sheets are formed from the coated strip by means of punching. Punching has the advantage of being convenient and quick. It is also possible to use other processes such as wire cutting and waterjet cutting, for example.

The annealing conditions are adjusted according to the soft magnetic material chosen.

For example, with a CoFe-based alloy with 35 to 55 wt % Co and up to 2.5 wt % V, the rest being Fe and unavoidable impurities, annealing for 6 h at 880° C. in dry hydrogen can be used.

With a CoFe-based alloy with 5 to 25 wt % Co, 0.3 to 5.0 wt % V, 0 to 3.0 wt % Cr, 0 to 3.0 wt % Si, 0 to 3.0 wt % Mn, 0 to 3.0 wt % Al, 0 to 0.5 wt % Ta, 0 to 0.5 wt % Ni, 0 to 0.5 wt % Mo, 0 to 0.2 wt % Cu, 0 to 0.25 wt % Nb, the rest being Fe and unavoidable impurities, annealing for 4 h at 1000° C. with slow cooling at 30 K/h to 900° C. and annealing in dry hydrogen can be used.

With a NiFe alloy with 29 to 82 wt % Ni, annealing at between 1000° C. and 1200° C. in dry hydrogen, e.g. for 5 h at 1150° C., can be used.

With an FeSi-based alloy with 2 to 4.5 wt % of at least one element from the group consisting of Si and Al, the rest being Fe and unavoidable impurities, final annealing at temperatures of typically 850° C. to 1150° C. can be used.

Alternatively, the heat treatment can be carried out on the strip (delivered fully finished), i.e. before the lamination sheets are formed.

In some embodiments, at least one segment is heat treated first, while the remaining segments of the laminated core, which have not undergone a heat treatment, are attached to the at least one heat-treated segment by means of adhesive connections to form the laminated core. This method can be used to heat treat one or more segments made from lamination sheets of a CoFe alloy, whereby the remaining segments comprising lamination sheets from a previously heat-treated FeSi alloy and these remaining segments are not subjected to a further heat treatment.

In some embodiments, at least one segment is heat treated under first heat treatment conditions and the remaining segments of the laminated core are heat treated under second heat treatment conditions that are different to the first heat treatment conditions. The segments are then attached by means of adhesive connections to form the laminated core. This method can be used for segments made of different alloys, for example, so that the magnetic properties of the segments can be optimised separately due to the different heat treatment conditions.

In one embodiment, the stator segments, in particular the stator segments in the form of stator teeth, are wound with an electroconductive wire and then assembled to form a stator. In other embodiments, the stator segments are first assembled to form a stator and the stator is then wound with an electroconductive wire.

BRIEF DESCRIPTION OF THE DRAWINGS

Embodiments are explained in greater detail below with reference to the drawings and examples.

DETAILED DESCRIPTION OF EXAMPLE EMBODIMENTS

Figure 1:
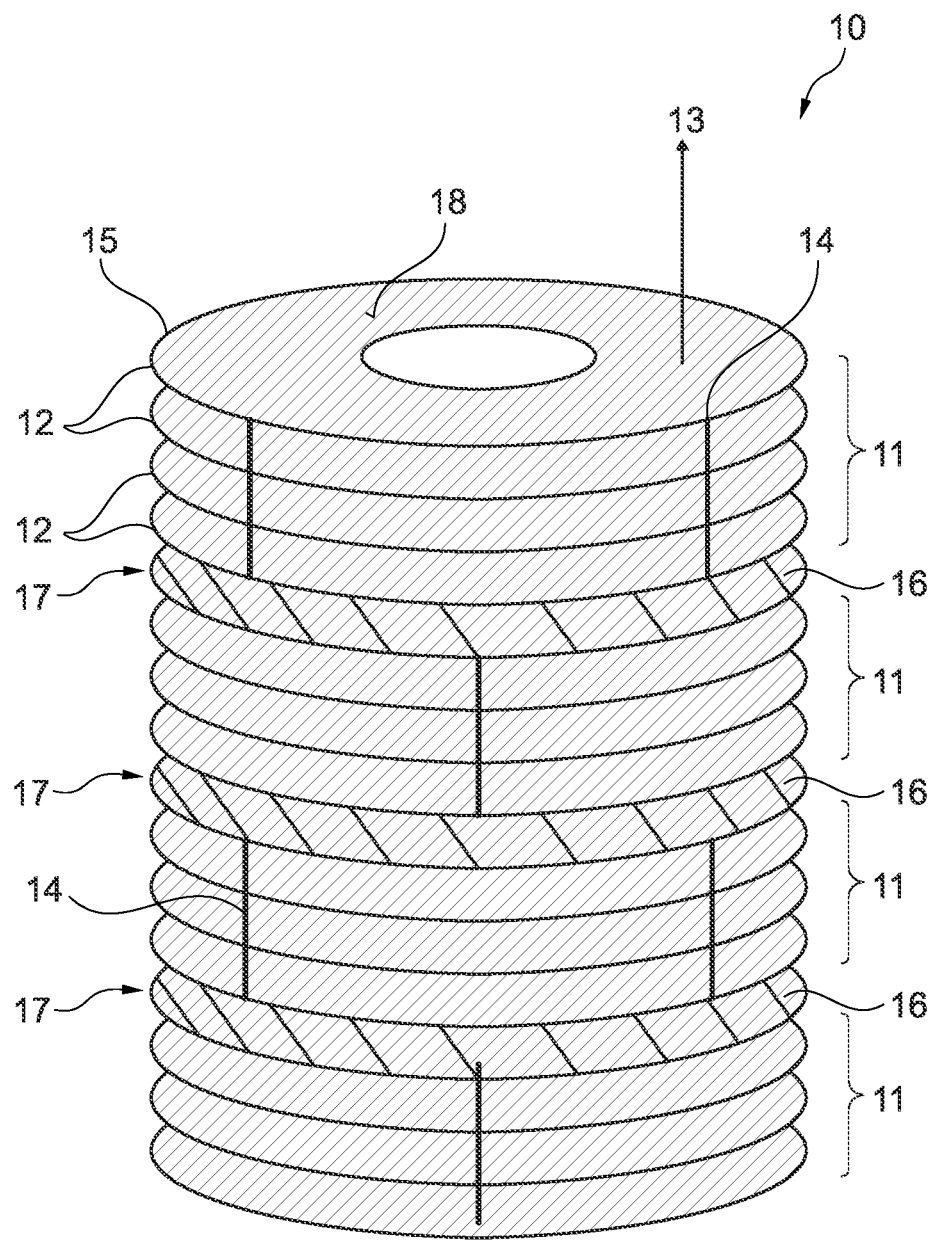
FIG. 1 shows a schematic drawing of a laminated core according to one embodiment.

FIG. 1 shows a schematic drawing of a laminated core 10 according to a first embodiment. The laminated core 10 comprises a plurality of segments 11. The segments 11 each comprise a plurality of soft magnetic lamination sheets 12 that are stacked one on top of another in a direction of stacking 13 that is arranged perpendicular to the main surface of the lamination sheet 12. These lamination sheets 11 are attached to one another by means of a first connection type 14 in order to form the segment. In the embodiment in FIG. 1, four lamination sheets 12 are shown in each segment 11. In practice, however, the segments 11 typically each comprise more than four lamination sheets 12. In the embodiment in FIG. 1, the first connection type is a weld seam that is arranged on an edge side of the lamination sheets 12.

In this embodiment, lamination sheets 12 and so the segments 11 are all annular in shape. However, the segments 11 may also be of other shapes. In a further embodiment (not shown), the lamination sheets 12 and thus the segments 11 each have the outer contour of a stator tooth or a plurality of stator teeth. One or two, or typically three or more, weld seams are applied on the edge sides 15 of the lamination sheet 12 to form a segment 11. The segments 11 are connected by means of a second connection type 17 in order to form the laminated core 10. In this embodiment, the four segments 11 are stacked one on top of another in the direction of stacking 13. A second connection type 17 is arranged between the outer end faces 18 of adjacent segments 11, the second connection type 17 being different from the first connection type 14. In this embodiment, the second connection type 17 is an adhesive connection 16.

The lamination sheets 12 within a segment 11 are therefore each connected to two adjacent lamination sheets by means of the first connection type 14 only. Only the outermost lamination sheets 12, which form the end faces 18 of the segments, are in contact with the adhesive layer 16.

The lamination sheets 11 are each formed of a soft magnetic alloy such as an FeSi-based alloy or CoFe-based alloy, for example. The individual lamination sheets 11 may also be formed by being punched from a strip or foil, for example. The lamination sheets 11 may each have a thickness of 0.05 mm to 0.5 mm, preferably 0.1 mm to 0.35 mm, preferably 0.1 mm to 0.2 mm, for example.

Figure 2:
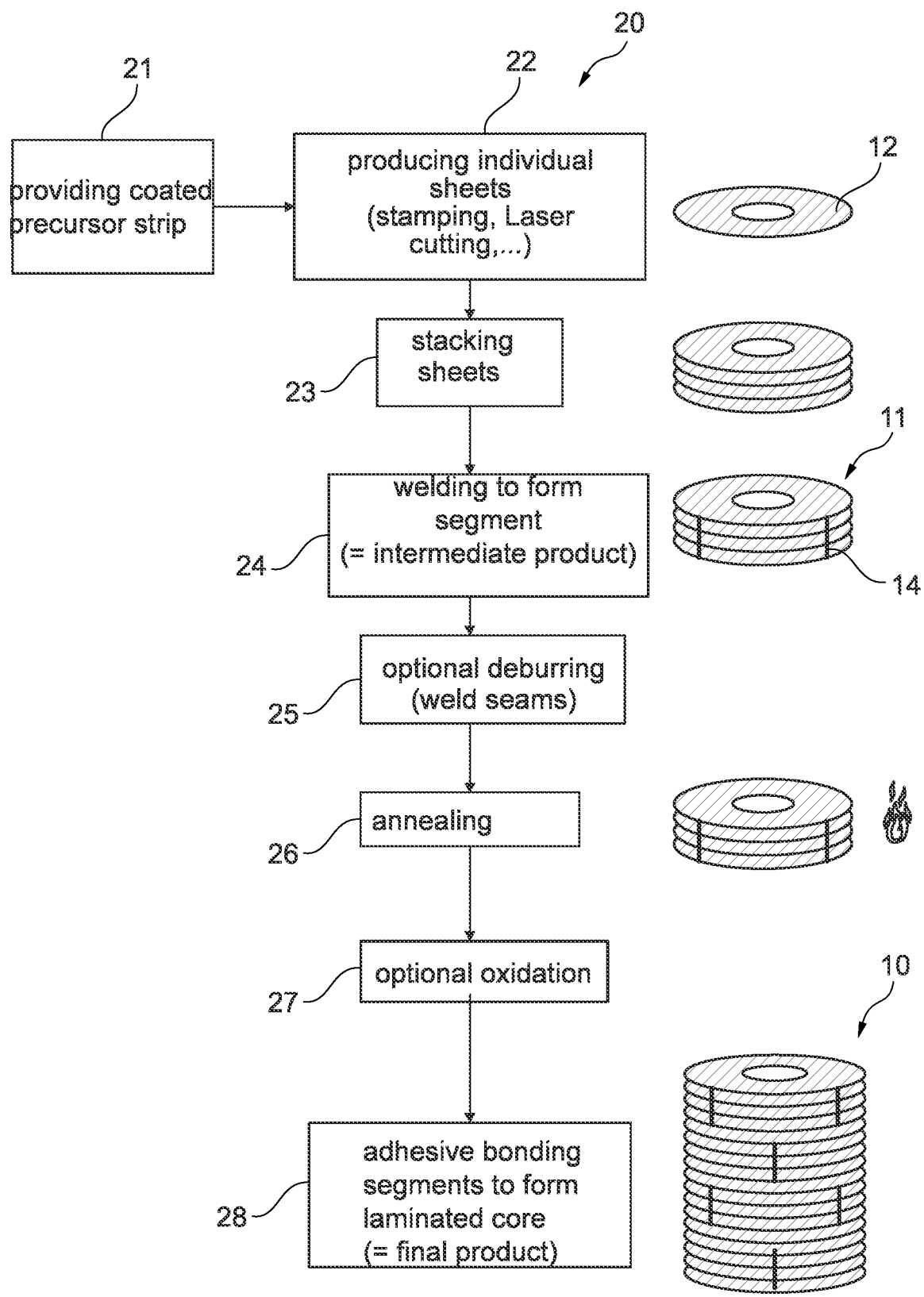
FIG. 2 shows a schematic drawing of a production route according to an embodiment for a laminated core.

FIG. 2 shows a schematic drawing of a production route 20 for a laminated core 10 made of one single type of material.

In box 21, a coated precursor material is provided. The precursor material used is a VACODUR 49 strip with a nominal composition of 49% Co, 49% Fe, 1.9% V and 0.1% Nb, for example. Here, the chosen strip thickness is relatively thin, within a range of 0.35 mm to 0.10 mm, for example, in order to minimise eddy-current losses during use. The strip is provided with a magnesium-methylate-based coating (DL1) in order to avoid welding during final annealing.

In box 22, the individual sheets, i.e. the lamination sheets 12, which may take the form of a stator sheet or a rotor sheet, for example, are then manufactured from the primary material. They may be formed by laser cutting, for example, but also by punching.

In box 23, the individual lamination sheets 12 thus obtained are then stacked one on top of another in groups of ten lamination sheets 12, for example, in a device. The number of lamination sheets 12 and so the stack height should be chosen so as, on one hand, to facilitate handling once they have been joined together, for example at least three lamination sheets and typically at least five lamination sheets, and, on the other, to be small enough to ensure that the finished laminated core 10 can be composed of at least four of these stacks that form a segment 11. It is, in principle, possible to vary the height in order, for example, to comply with a given required height of the laminated core 10.

In box 24, the stacked sheets 12 are then joined to one another by means of one or more linear weld seams to produce a segment 11. In one example, three lengthwise weld seams 16, for example, are applied, each offset by 120°. The segment 11 thus produced is an intermediate product and, in contrast to the thin individual sheets 12, offers excellent handling.

Optionally, in box 25, deburring is carried out. In a welding process of this type, depending on the process flow, a burr may form on a top 18 layer or on both top layers 18 of the segment 11. If this burr is larger than the adhesive that is to be applied subsequently, the burr is removed. This can be done manually, for example, by means of careful sanding. In principle, deburring may also take place shortly before the adhesive bonding process. However, it is gentler on the material if this mechanical processing takes place prior to final annealing.

In box 26, the welded segments 11 are then subjected to heat treatment, or "final annealing", during which the magnetic properties of the material are set. To this end, the segments 11 are placed on a flat surface. In one example, the parts are also weighted down in order to guarantee particularly good flatness. Annealing may be stationary or continuous. With materials made of 50% CoFe with the composition 49% Co, 49% Fe and 2% V, this type of final annealing is used.

Optionally, the annealed segments can also be oxidised. This oxidation annealing is carried out in air at temperatures of between 350° C. and 550° C. for a period of between 30 minutes and 3 hours, for example. This annealing produces oxides on the surface that have a higher electrical resistance than the basic material and so improve electrical layer insulation. Optionally, it is also possible carry out perform oxidation by adding water vapour to encourage the formation of iron oxides with a high electrical resistance.

In box 28, the annealed segments 11 are then adhesively bonded to one another. Bonding preferably only takes place between the top layers 18 of the segments 11, thereby preventing—as far as is technically possible—the adhesive 16 from getting between the welded-together lamination sheets 12.

Figures 3A, 3B:
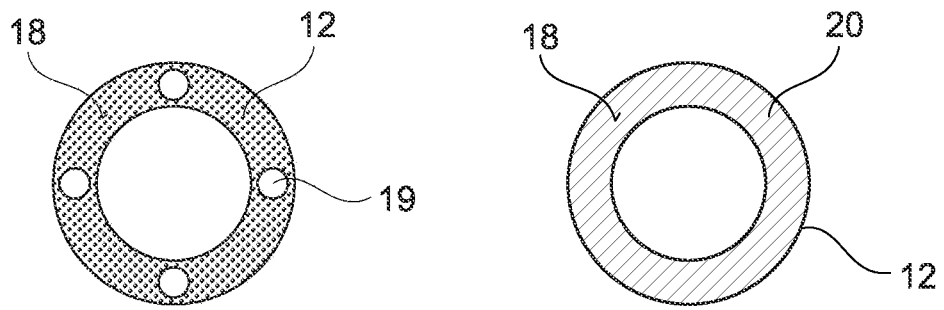
FIGS. 3a and 3b show examples of possible adhesive bonding techniques for connecting segments to one another.

The adhesive bonding of the top layers 18 of the segments 11 may be carried out by the surface application of adhesive, as illustrated in FIG. 3b. In an industrial process, however, it is preferably to spot bond the top layers 18, as shown in FIG. 3a, using spots of adhesive since this process can be more easily automated. In addition, adhesive spot bonding results in lower stresses. When setting up for bonding, the segments 11 may also optionally be rotated by 90°, for example. This both compensates for the profile shape of the strip of primary material across the height of the laminated core and avoids contact between the weld seams 14 of adjacent segments 11, thereby reducing the risk of additional eddy currents during use.

FIG. 3 shows examples of possible techniques for adhesive bonding the segments 11 to one another, the bonded surfaces being shown by means of hatching. In FIG. 3a, the adhesive 19 is applied in spots to the end face 18 of the segment 11. In FIG. 3b, the adhesive 20 is applied over a large area, for example over the entire end face 18 of the segment 11.

Figure 4:
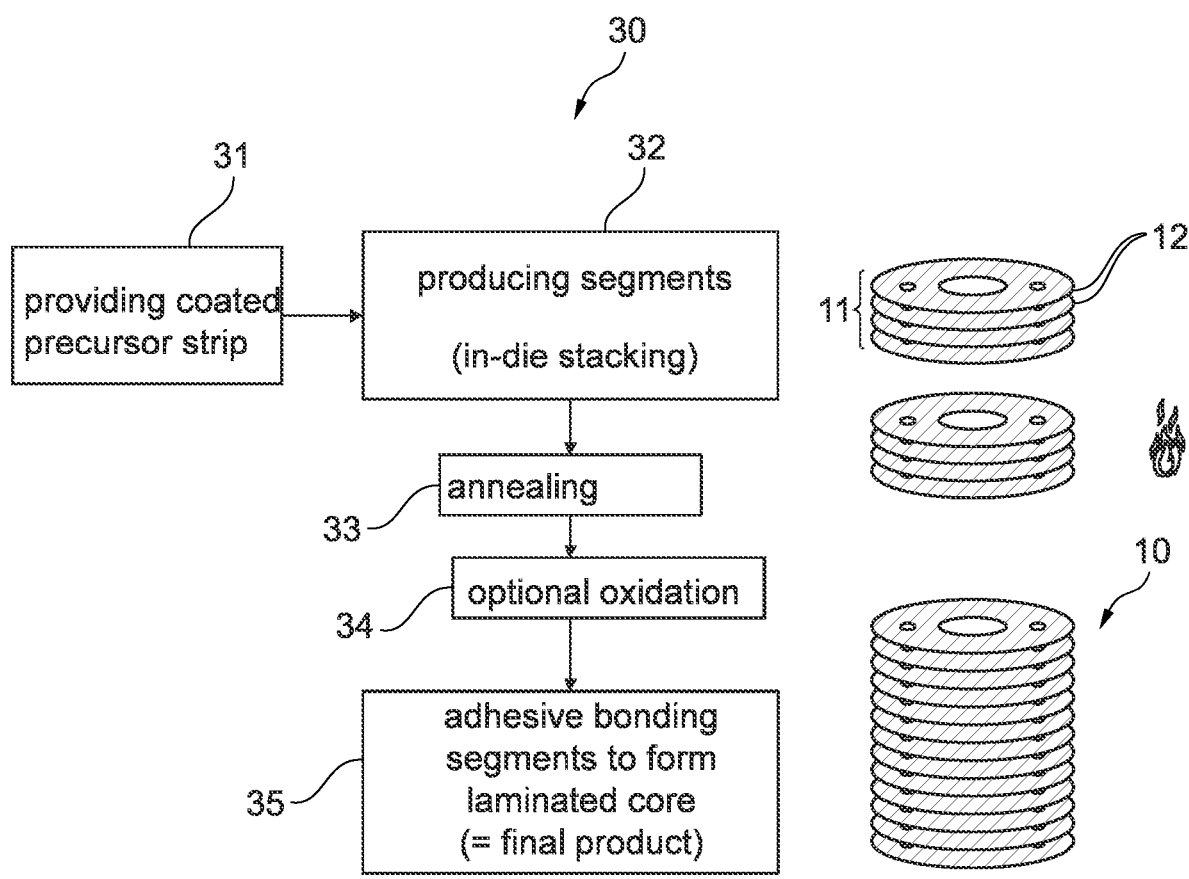
FIG. 4 shows a schematic drawing of a production route according to a further embodiment.

FIG. 4 shows a schematic drawing of a production route 30 according to a further embodiment. In box 31, a coated primary material is provided. The primary material used may be a strip of VACODUR 49 with a nominal composition of 49% Co, 49% Fe, 1.9% V and 0.1% Nb, for example. The chosen strip thickness is relatively thin, within a range of 0.35 mm to 0.10 mm, for example. The strip is also provided with a magnesium-methylate-based coating (DL1).

In this production route, in box 32 the segments 11 are produced in one step using an in-die stacking process, for example. Here both the forming of the lamination sheets 12, and their joining to form a segment 11 by means of connecting nipples that form recesses in the lamination sheets as a first connection type, take place in the punching die.

Alternatively, they may also be joined in the die by means of a spot laser that always connects two successive laminations, either by the outside or by the surface (laser in-die stacking), for example.

In all other respects the production route does not differ from the production route previously described and shown in FIG. 1. Consequently, the segments 11 are subjected to final annealing in box 33 and, optionally, oxidised in box 34. In box 35, the annealed segments are stacked and connected to one another by adhesive layers as a second connection type in order to produce the laminated core.

Figure 5:
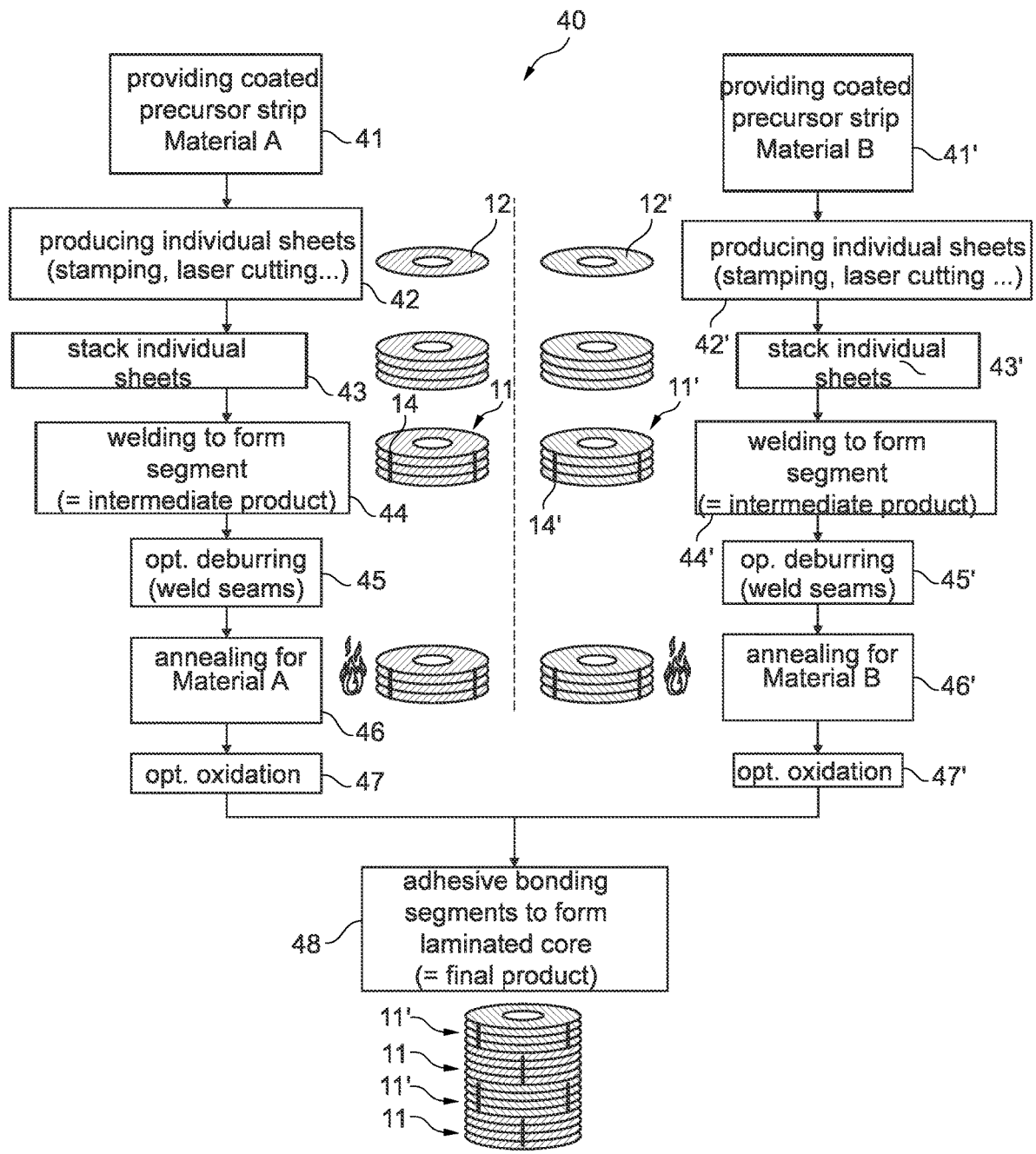
FIG. 5 shows a schematic drawing of a production route according to a further embodiment.

FIG. 5 shows a schematic drawing of a production route 40 according to a further embodiment that is suitable for a laminated core made of different types of material. Here, the different types of material may refer to the materials used, e.g. the use of VACODUR 49 (50% CoFe) as the first material and TRAFOPERM N4 (3% FeSi) as the second material. It is possible to use the same strip thickness, though different strip thicknesses may also be employed. The combination of a 50% CoFe alloy such as VACODUR 49 in a strip thickness of 0.10 mm with a less expensive material made from 3% SiFe, such as NO20 in a thickness of 0.20 mm, for example, is well suited to motors with high power density. Thus it is possible to combine VACODUR 49, a high-saturation CoFe material, and the SiFe material NO20, which is readily available commercially and also exhibits low hysteresis losses.

In some cases, it may also be useful to combine different thicknesses of identical materials, e.g. VACODUR 49 in a thickness of 0.20 mm and VACODUR 49 in a thickness of 0.10 mm. This achieves a clear reduction in eddy-current losses compared to a laminated core consisting exclusively of sheets with a thickness of 0.20 mm since these eddy-current losses increase quadratically with sheet thickness. As a result, the use of just some sheets with a thickness of 0.10 mm leads to a clear reduction in hysteresis losses and so an increase in the efficiency of the machine.

Initially, the two material types A and B are processed separately just as for one of the production routes for one type of material shown in FIGS. 2 and 3.

In the example illustrated, in box 41 the first material A is a VACODUR 49 strip (strip thickness 0.10 mm with an annealing-resistant, magnesium-methylate-based coating (termed DL1) and in box 41' the second material B is a strip of TRAFOPERM N4 (2.4% Si, 0.3% Al, rest Fe) with a strip thickness of 0.20 mm and an annealing-resistant zirconium-propylate-based coating (trade name HITCOAT).

In boxes 42 and 42', individual sheets are formed the two materials by punching and stacked separately from one another in a fixed number of sheets. In this example, in box 43 material A is stacked in stacks of twenty lamination sheets 12 due to the strip thickness. In box 43', material B with its double strip thickness is stacked in stacks of ten lamination sheets 12'. In boxes 44 and 44', the lamination sheets 11 are then connected by means of a weld seam to form segments 11, 11', and in boxes 45 and 45' the burrs that form at the ends of the weld are removed using sandpaper. In this example, to ensure even amounts of the two materials, the heights of the segments 11, 11' made of material A and B are almost identical.

In box 46, the segments made of material A are then subjected to stationary magnetic final annealing at an annealing temperature of 880° C. for an annealing time of 6 h in dry hydrogen with a saturation temperature of −30° C. or lower. This results in the recrystallisation of the material and subsequent grain growth, thereby setting the excellent magnetic properties of the alloy. The temperature of the phase transition α→α+γ from the ferritic to the ferritic/austenitic mixed zone is not exceeded during this process because this would result in a clear deterioration in magnetic properties. In this particular example, this limit temperature is 890° C.

In box 46', the segments made of material B are subjected to another stationary magnetic final annealing process at an annealing temperature of 1050° C. for an annealing time of 5 h in dry hydrogen with a saturation temperature of −30° C. or lower. Since SiFe materials with a Si content of over 1 wt % exhibit no α→γ phase transition, with this material it is possible to choose the highest possible annealing temperature in order to obtain larger grains and set the lowest possible coercive field strength.

It is therefore possible to carry out appropriate magnetic final annealing for each material. When using SiFe in its "fully finished" state, it is even entirely possible to dispense with final annealing completely.

In boxes 47 and 47', the annealed segments can then optionally also be oxidised. For example, material A can be oxidised at 400° C. for a period of 3 h in air. In the case of material B, due to the higher iron content and the associated faster oxidation speed, it is possible to choose a lower temperature or a shorter time, for example 400° C. for a period of 1 h. As the segments are subsequently adhesively bonded, it is important to select the oxidation conditions so as to ensure that the oxide layer created does not become too thick and that it continues to adhere securely.

In box 48, the annealed and oxidised segments 11, 11' of material A and material B are then alternately adhesively bonded to one another. In the example, this bonding involves the automatic application of adhesive spots on the top layer of a segment 11 made of material A and subsequently placing a second segment 11' of material B on top of it. This process is then repeated in the same way, respecting the stacking sequence A-B-A-B-A-B- . . . until the total core height is achieved.

The method set out above makes it possible to vary the amount of the two alloys at two points. Firstly, it is possible to choose different heights for segments made of different types of material. Secondly, it is also possible to vary the stacking of the segments that form the core as a whole so that instead of an alternating A-B stacking sequence, it is also possible to use an A-A-B stacking sequence in which two stacks of material A and one stack of material B are placed one on top of another. This permits a gradation in terms of costs and benefits in final production without having to change the intermediate product.

A number of examples are described below. Laminated cores made of one type of material by means of welding without adhesive bonding were produced as comparative examples.

COMPARATIVE EXAMPLE 1

The impact of welding as the sole connection type is examined using conventionally produced laminated cores made of one type of material.

The tests are carried out on punched sample rings measuring 28.5 mm×20.0 mm. Individual rings of VACODUR 49 with a strip thickness of 0.10 mm were magnetically finally annealed (for 6 h at 880° C.) and magnetically characterised as a reference (state A). A laminated core is then produced from the same strip as follows (state A'). The rings were joined longitudinally in relation to the core axis by means of three weld seams offset by 120° to form a laminated core. This core is then subjected to the same final annealing process as for reference state A.

Similarly, individual rings with the same dimensions made of TRAFOPERM N4, batch 100516, with a strip thickness 0.35 mm were finally annealed and magnetically characteristics (state B). Here, too, rings were punched out of the same strip, welded together to form a core and subjected to an identical final annealing process (state B').

TABLE 1

| State | Material | B3 in T | B80 in T | Hc in A/m | $\mu_{max}$ |
|---|---|---|---|---|---|
| A | VACODUR 49 | 2.02 | 2.28 | 41 | 18,893 |
| A' | VACODUR 49 | 2.04 | 2.33 | 37 | 23,223 |
| B | TRAFOPERM N4 | 1.38 | 1.73 | 25 | 18,087 |
| B' | TRAFOPERM N4 | 1.38 | 1.73 | 25 | 17,773 |

Table 1 shows magnetic characteristics of induction B3=B(3 A/cm), induction B80=B(80 A/cm), coercive field strength Hc and maximum permeability $\mu_{max}$ of individual rings (A, B) and welded and annealed laminated cores (A', B').

A comparison of starting state B and laminated core B' shows that in the case of the FeSi alloy TRAFOPERM N4 welding and final annealing result in identical magnetic characteristics. A comparison of starting state A with laminated core A' shows that in the case of the 50% CoFe alloy VACODUR 49 welding and final annealing can even result in a slight improvement compared to the reference state.

Overall, therefore, it is possible to produce laminated cores with soft magnetic properties identical to the reference state, i.e. non-joined, tension-free individual laminations, from one type of material by welding and annealing with both 50% CoFe and with 3% SiFe.

COMPARATIVE EXAMPLE 2

As a further comparative example 2, a welded laminated core made of two types of material is produced. The basic material used is twelve lamination sheets of VACODUR 49 with a strip thickness of 0.35 mm (material A) and twelve sheets of TRAFOPERM N4 with a strip thickness 0.35 mm (material B). Both materials are provided with a magnesium-methylate-based DL1 coating.

Table 2 relates to test cores for examining the influence of welding on laminated cores made of different materials A, B, and provides an overview of the states tested. In addition to a non-welded reference core R1 made of loose rings, five cores 2 to 6 is produced in which the stacking sequence of the lamination sheets is varied, as specified in Table 2, the lamination sheets are then welded to one another and the resulting laminated core is annealed.

TABLE 2

| Sample | Core structure | Number N of weld contacts | Number $N_{A-B}$ of A-B weld contacts |
|---|---|---|---|
| R 1 | (AB) × 12 Loose rings | 0 | 0 |
| 2 | (12A-12B) × 1 | 23 | 1 |
| 3 | (6A-6B) × 2 | 23 | 3 |

TABLE 2-continued

| Sample | Core structure | Number N of weld contacts | Number $N_{A-B}$ of A-B weld contacts |
|---|---|---|---|
| 4 | (4A-4B) × 3 | 23 | 5 |
| 5 | (2A-2B) × 6 | 23 | 11 |
| 6 | (A-B) × 12 | 23 | 23 |

The core structure column describes the stacking of the individual sheets. The sheet sequence given in brackets is repeated until a total of 24 sheets is reached, e.g. (AB)×12 for the ABABABABABABABABABABABAB sequence or (4A-4B)×3 for the AAAA-BBBB-AAAA-BBBB-AAAA-BBBB sequence. The hyphens indicate welds between different materials (A-B or B-A).

The number N describes the number of adjacent pairs of sheets that are welded to one another. No distinction is made here between sheets of the same material (A-A or B-B) and sheets of different materials (A-B). With a total of 24 sheets stacked one on top of another, the highest number for N is thus 23.

Moreover, the number $N_{A-B}$ describes the number of adjacent pairs of sheets welded to one another, i.e. welds between different sheets only (A-B).

Both N and $N_{A-B}$ simply describe the number of pairs of sheets welded together and are therefore independent of the number of laser weld seams made along the height of the laminated core. In this embodiment, three linear weld seams are made, though in principle the number may vary depending on core geometry and strength requirements.

State 1 is the reference core on which no welding is carried out. The individual rings are subjected to magnetic final annealing. The annealing parameters of 6 h at 880° C. in dry hydrogen is optimised for the 50% CoFe material, but also produce sufficiently good results with the 3% SiFe material B. This state is the optimum obtained when the two materials are mixed in equal proportions, tensions in the material are avoided and the material is not damaged by a weld seam. The annealed rings are stacked one on top of another in the sequence AB for measurement.

With core 2, 12 rings made of VACODUR 49 (material A) topped by 12 rings made of TRAFOPERM (material B) N4 is welded to one another by three linear weld seams that is offset by 120° in relation to one another (parameters: 500 W power, feed rate 1000 mm/min, defocused welding, Z+2.5 mm, seam width: approx. 0.1-0.8 mm, seam depth: approx. 0.35 mm). With this sheet stacking sequence, only one odd sheet pair is welded together ($N_{A-B}$=1). Following welding, core 2 underwent the same final annealing process as core 1.

For cores 3 to 5, the number of odd weld seams is increased by a change in stacking sequence up to core 6, in which sheets A and B is placed alternately one on top of another and connection by a weld seam thus resulted in 23 odd pairs of sheets welded to one another. Following welding, these cores also underwent the same final annealing process.

All annealed cores 1 to 6 is magnetically characterised, see Table 3. The measurements are carried out in line with IEC 60404-4 by placing the cores in a plastic tray, winding with primary and secondary coils, energising the primary coil and measuring the voltage integrated on the secondary side. To calculate the magnetic flux B, the magnetic cross section $A_{Fe}$, calculated from the sample mass m and mass density ρ, is also required. When measuring a welded core comprising two different materials, density must be adjusted. As the measurement of density at the welded core is imprecise in experiments (formation of air bubbles between the individual layers), in the test the individual masses $m_A$ and $m_B$ of the punching rings is determined in advance, the total mass m=$m_A$+$m_B$ is calculated and when the material densities $ρ_A$ and $ρ_B$ is known the averaged density ρ=$m_A$/m·$ρ_A$+$m_B$/m·$ρ_B$ is calculated. In concrete terms, density $ρ_A$=8, 12 g/cm³ is used for VACODUR 49, density $ρ_B$=7.65 g/cm³ is used for TRAFOPERM N4 and the averaged density ρ=7.892 g/cm³=is used for the resulting core.

In terms of induction, the reference core 1 with identical amounts of basic materials A and B corresponded to the mean of the individual values for A and B (see Table 1). Mathematically, this gave a mean value of 2.02 T+1.38 T)/2=1.70 T for induction B3 (and a mean value of (2.28 T+1.73 T)/2=2.005 T for induction B80), corresponding relatively accurately to the measured values of 1.72 T and 2.02 T.

TABLE 3

| Sample | B3 in T | B80 in T | Hc in A/m | $μ_{max}$ |
|---|---|---|---|---|
| 1 | 1.72 | 2.02 | 29 | 18,957 |
| 2 | 1.64 | 2.00 | 27 | 17,734 |
| 3 | 1.51 | 1.99 | 25 | 15,438 |
| 4 | 1.35 | 1.99 | 24 | 11,570 |
| 5 | 1.15 | 1.98 | 23 | 8,105 |
| 6 | 0.99 | 1.94 | 25 | 6,623 |

Table 3 gives the magnetic characteristics of the test core following final annealing. Cores 2 to 6 exhibit a similarly high induction B80 to the reference core 1. This is due to the fact that at the high field strength of 80 A/cm induction is already largely determined by saturation magnetisation. Since saturation magnetisation is dependent on the material composition but not on structure or stress state, the welding has only a minor influence on the B80 characteristic.

In contrast, induction B3 and maximum permeability $μ_{max}$ for cores 2 to 6 are clearly below the reference state 1. As the coercive field strength $H_c$ shows no deterioration, it can be assumed that the welding of the mixed core has caused a shearing of the magnetic hysteresis loop. Deterioration of this type may be explained by internal stresses, for example. Since welded and laminated cores made of one type of material do not exhibit these internal stresses, it can be assumed that they are due to the welded connection between the different materials.

In the extreme case of core 6, in which each weld transition represents a transition between different materials, induction B3 has fallen to 0.99 T as compared to 1.72 T in the reference state and $μ_{max}$ has fallen to 6,623 as compared to 18,957 in the reference state.

Figure 6:
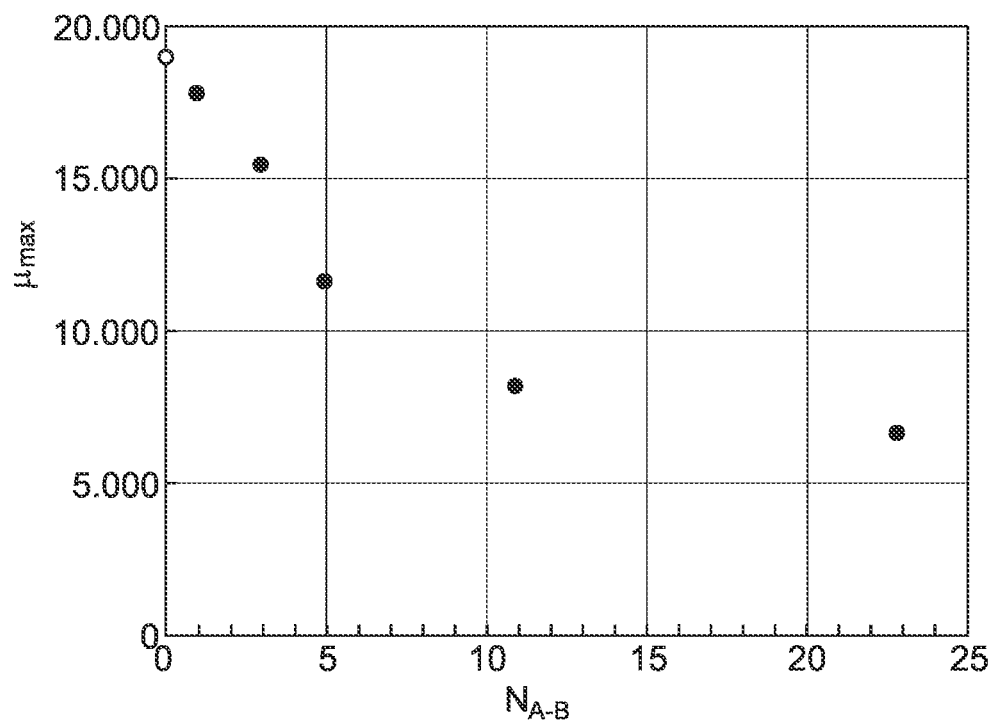
FIG. 6 shows a graph of maximum permeability $\mu_{max}$ as a function of the number $N_{A-B}$ of pairs of sheets of different materials that are welded together.

In FIG. 6, maximum permeability $μ_{max}$ is represented as a function of the number $N_{A-B}$ of pairs of sheets made of different materials welded together (A-B or B-A). Except for the reference sample indicated by the open dot at $N_{A-B}$=0 and N=0, all the samples have the same total number N=23 of welded contacts. FIG. 6 shows that the deterioration in soft magnetic properties correlates directly with the number $N_{A-B}$, i.e. the more sheets of different materials are connected together, the more sharply maximum permeability falls.

The development of internal stresses during the welding process or during final annealing is due to the different coefficients of expansion of the materials. The rigid weld connection of the weld impedes the expansion and elastic recovery of the material as it heats up or cools. If the materials connected to one another have different coefficients of expansion, the individual sheet layers expand differently.

In the example given here, the coefficient of expansion α measured in a range between 20° C. and 400° C. is 9.8 ppm/K for VACODUR 49 and 13.7 ppm/K for TRAFOPERM N4. With final annealing at 880° C. and cooling to room temperature (20° C.), it is therefore possible to estimate a relative change of (13.7-9.8) ppm/K·860 K=3354 ppm, resulting in enormous stress anisotropy in the material. This is obviously the cause of the deterioration in soft magnetic properties.

The resulting stresses also expressed themselves in the fact that in some of the laminated cores made of one type of material with no welding annealing resulted in the detachment of the top layers.

COMPARATIVE EXAMPLE 3

It has been found that, like welding, the adhesive bonding of sheets to form a laminated core results in stresses in the material and so to a deterioration in soft magnetic properties. In a random test, individual annealed rings made of VACODUR 49 and TRAFOPERM N4 in strip thicknesses of 0.35 mm and 0.10 mm respectively is magnetically characterised, bonded adhesively to form single-material laminated cores and then characterised again.

The individual punched rings in states C, D, E and F with dimensions of 28.5 mm×20.0 mm is annealed in dry hydrogen at 880° C. for a period of 6 h. The magnetic characterisation of the annealed rings comprises the initial magnetization curve B(H) with characteristic values B3=B(3 A/cm), B80=B(80 A/cm) and maximum permeability $\mu_{max}$. Coercive field strength $H_c$ is also determined.

The individual rings are adhesively bonded to form laminated cores C', D', E' and F' by placing them in a device, soaking the rings in the adhesive and then allowing the rings to set. This process results in extensive adhesion of the rings to one another. Magnetic characterisation is carried out as for the individual rings.

As can be seen from the data, with the CoFe material the adhesion process results in a clear deterioration in permeability, both at 0.35 mm (C, C') and at 0.10 mm (D, D'). The induction value B(3 A/cm) also deteriorates, this effect being particularly marked in core D' in which the sheets are only 0.10 mm thick. This is presumably due to the fact that the heights of cores C' and D' are similar, i.e. core D' with the thinner sheets comprises a larger number of sheets and so a larger number of adhesive connections.

Similar deterioration caused by the adhesion process can also be observed in the core made of Si—Fe, above all in the form of a drop in maximum permeability.

TABLE 4

| State | Material | Strip thickness in mm | B3 in T | B80 in T | $H_c$ in A/m | $\mu_{max}$ |
|---|---|---|---|---|---|---|
| C | CoFe | 0.35 | 2.05 | 2.30 | 34.5 | 21,100 |
| C' | CoFe | 0.35 | 1.96 | 2.29 | 34.5 | 14,776 |
| D | CoFe | 0.10 | 2.03 | 2.28 | 43.8 | 18,909 |
| D' | CoFe | 0.10 | 1.56 | 2.24 | 37.5 | 12,223 |
| E | SiFe | 0.35 | 1.38 | 1.70 | 23.8 | 18,120 |
| E' | SiFe | 0.35 | 1.36 | 1.70 | 26.9 | 11,830 |
| F | SiFe | 0.10 | 1.32 | 1.71 | 33.3 | 11,402 |
| F' | SiFe | 0.10 | 1.29 | 1.72 | 33.3 | 8,902 |

Table 4 shows the influence of adhesive bonding on the magnetic properties of the individual punched rings made of a CoFe alloy, illustrated by a comparison of states C, D and C', D', and from an SiFe alloy, illustrated by a comparison of states E, F and E', F'.

The test also shows that the adhesive process between the sheets results in stresses accompanied by a drop in permeability. Whether this drop in permeability is acceptable must be examined for each particular application. However, induction B80=B(80 A/cm) is not affected by the adhesive process since it is substantially dependent on saturation magnetisation.

In any event, and in particular with thinner strip thicknesses of 0.20 mm or less, the complex handling requirements of individual sheets during annealing is disadvantageous. In industrial manufacture, it results in increased workload and so higher costs.

Laminated Cores According to the Invention
Laminated Core 1

A strip made of VACODUR 49 having a nominal composition of 49% Co, 49% Fe, 1.9% V and 0.1% Nb is used as the primary material. The strip has a thin sheet thickness of only 0.10 mm and is coated with an inorganic, annealing-resistant, magnesium-methylate-based coating.

Rings measuring Ø28.5 mm×Ø20.0 mm are punched out of the material and threaded into a device. After every 10 rings (according to the number of rings in a segment), a brass disc is inserted as a separator. Due to the inadequate welding between the brass disc and the VACODUR sheets, after linear welding this results in a plurality of independent ring cores made of VACODUR 49 sheets, each comprising 10 rings that are connected to one another.

For the test, three weld seams are made on the exterior, offset in relation to one another by 120°. Defocussed laser welding is carried out at 300 W and a feed rate of 1000 m/min. The seam width is approx. 0.1 to 0.8 mm, the seam depth 0.35 mm. If a burr develops on the top surfaces due to the solidified melt front during laser welding, it is removed by sanding, for example.

The welded segments are then subjected to magnetic final annealing. To this end, they are scattered on a flat surface. In one example the parts are also weighted down in order to guarantee particularly good flatness. Annealing takes place for 6 h at 880° C. in dry $H_2$. These conditions represent "magnetically optimum" final annealing for VACODUR 49 and are designed to set a recrystallised, large-grain structure.

Firmly grouping 10 sheets results in very good core handling in comparison to the usual process of annealing individual rings.

Individual rings made of the same material with the same geometry is subjected to annealing and then measured as reference R1. As a result, this reference measurement represents the magnetically optimum state without the influence of stresses caused by the connecting technique.

Reference R2 represents the measurement of a plurality of loose annealed segments placed one on top of another.

Reference R3 represents a laminated core in which all the individual layers are adhesively bonded together. To this end, the 60 individual rings are assembled in a common device and soaked in a bath of low-viscosity capillary adhesive (VAC magnet bonder K01). This adhesive passes between the layers of the stack by capillary action such that all the sheet layers are charged with adhesive. Consequently, in this core all the sheet layers are adhesively bonded to one another, resulting in 59 adhesion surfaces.

For embodiments E1 to E4 according to the invention, six annealed segments are adhesively bonded to one another to form a laminated core. To this end, an acid-free, methacrylate-based adhesive based on the radical polymerisation of methacrylic acid esters is used. In conjunction with an activator that produces starter radicals for polymerisation, setting can start within a few seconds at room temperature. Alternatively, setting can take place as a result of heating to 120° C.

In the states according to the invention, adhesion takes place on the outermost layers or sheets of the segments only. Embodiments E1 and E2 are bonded by the application of adhesive to the surfaces of the outermost layers. With this type of bonding, adhesive may seep out at the edges of the bonded segments. This excess adhesive is removed by hand. Examples E3 and E4 are spot bonded only, i.e. three spots of adhesive are applied distributed evenly around the circumference on the top layers of the segments.

In examples E1 to E4, this results in only five adhesive surfaces in a laminated core comprising 60 sheets (corresponding to six segments).

Table 5 shows magnetic properties of VACODUR 49 segments in various states of processing according to the invention. In addition to inductions B(3 A/cm), B(10 A/cm), B(25 A/cm), B(50 A/cm) and B(80 A/cm), coercive field strength Hc and maximum permeability $\mu_{max}$ are also determined.

Since the adhesive used is only suitable for a temperature range of –20° C. to +80° C., in some embodiments it is used as an assembly aid. For later use as a laminated core for an electric machine in which a broader temperature range of between –40° C. to +180° C. is typically required, the laminated core is also fixed in the housing by means of the coils, by means of insulating resin or mechanically by fastening it in the housing.

An adhesive with better temperature stability can also be used. In a completely bonded laminated core, the associated greater rigidity would, in principle, result in clearly greater deterioration in magnetic properties. In the case specified in the invention, however, the number of layers of adhesive is significantly reduced, thereby reducing the influence of the adhesive.

Laminated Core 2

In a further embodiment according to the invention, the method is used to produce a laminated core from two different materials. VACODUR 49, batch 7603396A, in a strip thickness of 0.10 mm (material A) and TRAFOPERM N4, batch 100516, in a strip thickness of 0.10 mm (material B) are used. Both primary materials are provided with a magnesium-methylate-based coating (DL1).

Individual punched rings made of this material measuring 28.5 mm×20.0 mm are lined up on a device and connected

TABLE 5

| | Adhesive | B (3 A/cm) in T | B (10 A/cm) in T | B (25 A/cm) in T | B (50 A/cm) in T | B (80 A/cm) in T | Hc in A/c m | $\mu_{max}$ |
|---|---|---|---|---|---|---|---|---|
| R1 | — | 2.02 | 2.20 | 2.26 | 2.28 | 2.29 | 0.31 | 22,060 |
| R2 | — | 2.07 | 2.22 | 2.27 | 2.29 | 2.29 | 0.35 | 22,316 |
| R3 | Capillary adhesion (K01) | 1.56 | 1.95 | 2.14 | 2.22 | 2.26 | 0.375 | 12,223 |
| E1 | MB120 surface | 1.84 | 2.12 | 2.23 | 2.27 | 2.29 | 0.406 | 15,618 |
| E2 | MB120 surface | 1.82 | 2.12 | 2.25 | 2.30 | 2.33 | 0.345 | 17,163 |
| E3 | MB120 spot | 1.86 | 2.13 | 2.23 | 2.27 | 2.29 | 0.316 | 19,669 |
| E4 | MB120 spot | 1.91 | 2.15 | 2.24 | 2.29 | 2.31 | 0.338 | 19,170 |

Comparison of the individual annealed rings R1 with the annealed segments R2 reveals almost identical magnetic properties. This is particularly evident in the high induction B(3 A/cm) of over 2.0 T and the maximum permeability $\mu_{max}$, which in both cases is approx. 22,000. Welding the segments followed by annealing therefore has no negative influence on the soft magnetic properties when compared with annealing individual non-welded rings.

The completely adhesively bonded laminated core R3 shows a clear deterioration due to the adhesive bonding process. Induction B(3 A/cm) reaches a value of only 1.56 T and maximum permeability drops to 12,223. The marked deterioration is due to the large number of adhesively bonded surfaces and the associated stresses between the sheets. The deterioration observed may be even greater depending on the choice of adhesive, since the adhesive used here is optimised to produce minimum possible shrinkage during the setting process.

Despite the additional adhesive bonding process, variants E1 to E4 manufactured according to the invention exhibit very good soft magnetic properties, i.e. induction B(3 A/cm) is well above 1.8 T and maximum permeability $\mu_{max}$ reaches values of almost 20,000. Both values are close to those shown by references R1 and R2.

A comparison of surface application (E1, E2) and surface application (E3, E4) shows no substantial differences. Both methods are suitable for setting good soft magnetic properties.

by means of three weld seams that are offset by 120° in relation to one another to form segments, each comprising 10 rings (parameters: power 400 W, feed rate 1000 mm/min, defocussed welding, Z+2.5 mm, seam width approx. 0.1 to 0.8 mm, seam depth approx. 0.35 mm). In this way segments made of material A and segments made of material B are manufactured.

The segments are then subjected to final annealing (6 h at 880° C., H₂) to set the magnetic properties. With material A, this final annealing sets optimum magnetic characteristics in terms of coercive field strength Hc and induction B3. It also sets a high induction B3 for material B. It is also possible to anneal material B at a higher temperature, e.g. at 1050° C. or 1150° C. In this case, the greater grain growth results in a lower Hc, though the loop shape also changes and induction B3 drops.

In addition to the segments, individual rings made of materials A and B are also annealed as references for the material properties after annealing.

The annealed segments are adhesively bonded in different manners, but three segments made of material A are always bonded to three segments made of material B. The stacking sequence is ABABAB with segments made of different materials alternating.

Example R4 is not adhesively bonded and serves as a reference. The welded annealed segments are stacked loose one on top of another in the stacking sequence ABABAB, but are not connected to one another. This produces a reference without the additional internal stresses that might be produced by the adhesive bonding process.

Example R5 is adhesively bonded using an epoxy-based capillary adhesive. To this end, the segments are stacked and brushed with adhesive such that it penetrates all intermediate layers. Adhesive residue is removed after 10 minutes. The cores are cured at 145° C. for 4 h in a furnace under a light weight.

Examples M1, M2, M3 and M4 are bonded using a quick setting adhesive at room temperature without activation. In tests M1 and M2 four adhesive spots are applied on each top layer and the segments bonded to one another. In tests M3 and M4 the adhesive is applied over the surface. The cores are left to set at room temperature.

Examples M5 and M6 correspond to states M1 and M3, the bonded laminated cores also being cured for 1 h at 120° C. in air. This curing treatment represents cases in which laminated cores are exposed to high temperatures during use, as is the case with electric motors, for example.

All states are magnetically characterised in line with IEC 60404-4. Table 6 shows induction B3=B(3 A/cm), induction B80=B(80 A/cm), coercive field strength Hc and maximum permeability $\mu_{max}$.

In addition to the results obtained from the segments, it also shows magnetic characteristic values for reference states R-A and R-B, i.e. the individual annealed rings. In this state there are no stresses and these values therefore represent the optimum characteristics for this annealing state.

As a further reference R-C, individual annealed rings made of the alloy VACOFLUX X1 in strip thickness of 0.20 mm are magnetically characterised. This material comprising 17% Co, 1.5% V and additions of up to 0.3% Si represents an FeCo material with a lower Co content than VACODUR 49 (reference A). The material is therefore more economical and still has a higher saturation than the 3% SiFe material TRAFOPERM N4 (reference B). It therefore represents a commercial alternative to the methods outlined above. Annealing is carried out for 4 h at 1000° C. in dry hydrogen.

TABLE 6

| State | B3 | B80 | Hc in A/m | $\mu_{max}$ |
|---|---|---|---|---|
| R-A | 2.02 | 2.28 | 41 | 18,893 |
| R-B | 1.38 | 1.73 | 25 | 18,087 |
| R-C | 1.49 | 1.96 | 40 | 13,196 |
| R4 | 1.70 | 1.99 | 34 | 17,608 |
| R5 | 1.13 | 1.98 | 38 | 6,704 |
| M1 | 1.62 | 1.98 | 33 | 16,204 |
| M2 | 1.58 | 1.97 | 33 | 14,872 |
| M3 | 1.59 | 1.98 | 33 | 15,026 |
| M4 | 1.61 | 2.00 | 37 | 14,138 |
| M5 | 1.50 | 1.98 | 34 | 12,876 |
| M6 | 1.17 | 1.97 | 36 | 7,718 |

Table 6 shows magnetic properties of test cores.

As expected, reference state R4 has an average induction B3 or B80 that corresponds approximately to the mean values of the materials A and B used. This mix of materials achieves an induction B3 of 1.70 T even at a low field strength of 3 A/cm. Maximum permeability is also very high at 17,608.

Adhesive bonding using a capillary-action adhesive (state R5) results in a clear deterioration of soft magnetic properties. Induction B3 drops to only 1.13 T and maximum permeability to 6,704. As a result, though this state exhibits higher magnetisation B80 at high field strengths due to the percentage of material A, induction B3 is below the levels measured for the two basic materials A and B. This clear deterioration is due to the fact that all the sheets are bonded to one another in the adhesive bonding process, resulting in stresses between all the layers of the laminated core.

In states M1 and M2 according to the invention, only the top layers of the segments are spot bonded to one another. The adhesion thus created is very gentle and results in low stresses between the materials. Accordingly, induction B3 at 1.62 T and 1.58 T is almost at the level of non-adhesively bonded reference state R1, as is maximum permeability $\mu_{max}$ at 16,204 and 14.872.

In states M3 and M4 according to the invention, once again only the top layers of the segments are adhesively bonded to one another, although here the layers are surface bonded. Here, too, the soft magnetic properties are very good with induction B3 at 1.59 T and 1.61 T and maximum permeability $\mu_{max}$ at 15,026 and 14,138.

The quick setting adhesive used does not set completely at room temperature without an activator. To allow the adhesive to set completely, the laminated cores M1 and M3 are aged for 1 h at 120° C.

Following this process, the adhesive is fully set and the resulting laminated cores M5 and M6 exhibit a perceptibly higher rigidity. The soft magnetic properties of the two laminated cores have therefore deteriorated. However, while core M5, in which the top layers are only spot-bonded, continues to exhibit a relatively high permeability of 12,876, the drop in permeability is much more marked for core M6, in which the top layers are surface bonded. The greater the surface are bonded, therefore, the higher the rigidity of the adhesive once set.

Large area surface bonding of the top layers can result in good magnetic results. It may also, however, result in stresses in the core due to the different heat expansion behaviours of the materials where the operating temperature of the core differs significantly from the setting temperature of the adhesive.

The optimum state in terms of soft magnetic properties is therefore the spot-bonding of the top layers of the annealed segments. This state is relatively independent of operating temperature since the adhesive spots have only a minimal effect on the stresses in the laminated core.

Figure 7:
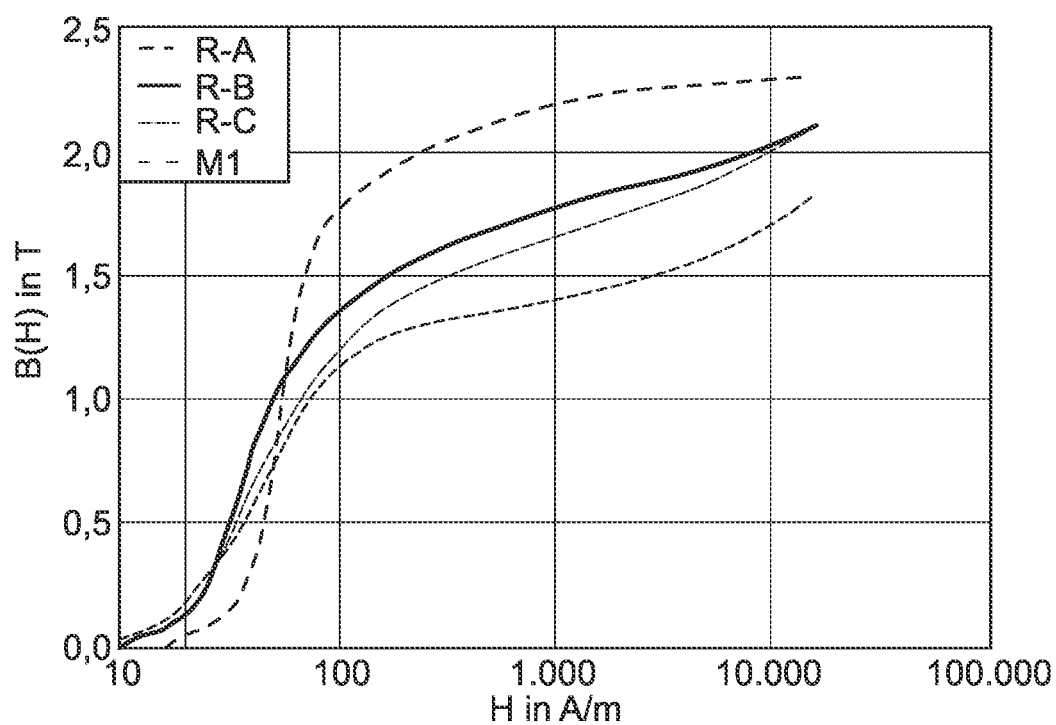
FIG. 7 shows initial magnetization curves for the laminated core M1 according to the invention in comparison with the initial magnetization curves for basic materials A, B and reference material C.

FIG. 7 shows the initial magnetization curves of laminated core M1 according to the invention as compared to the initial magnetization curves of the basic materials R-A and R-B and the reference material R-C. It can be seen that the induction B(H) of M1 corresponds approximately to the mean value of A and B at high field strengths. It is particularly surprising that it is possible to achieve very high inductions at low field strengths using the multi-step connecting technique described above.

Comparison with the reference material R-C produces identical values at the highest measured field strength of 16,000 A/m. In the low field strength range, in particular, however, the inductions of the core according to the invention are higher than those of the reference material R-C.

Laminated Core 3

However, the method according to the invention also makes it possible to combine materials in quite different material classes such as 50% CoFe and 49% NiFe in such a manner that they retain their individual characteristics.

In the following example, a laminated core made of VACODUR 49 with a strip thickness of 0.1 mm (material G) and PERMENORM 5000 V5 with a strip thickness of 0.10 mm (material H) is produced. Material G is a CoFe material with a composition of 49% Co 49% Fe 2% V and 0.1% Nb, while material H is a NiFe material with approx. 49% Ni. The outstanding feature of the CoFe material is its high saturation polarisation of 2.30 T. The NiFe material, on the other hand, has a clearly lower saturation of 1.55 T, but an extremely low coercive field strength of just 5 A/m.

Punched rings (28.5 mm×28.0 mm) are produced from both materials and joined together in different ways. Table 7 lists the magnetic characteristics of the states tested, i.e. induction B3=B(3 A/cm), induction B80=B(80 A/cm), coercive field strength Hc and maximum permeability $\mu_{max}$.

TABLE 7

| State | Materials | B3 in T | B80 in T | Hc in A/m | $\mu_{max}$ |
|---|---|---|---|---|---|
| R-G1 | G | 2.02 | 2.29 | 31 | 22,060 |
| R-H1 | H | 1.35 | 1.57 | 5 | 98,510 |
| R-G2 | G | 2.07 | 2.29 | 35 | 22,316 |
| R-H2 | H | 1.30 | 1.56 | 4 | 78,640 |
| R6 | G, H | 1.71 | 1.93 | 20 | 40,000 |
| E1 | G, H | 1.65 | 1.96 | 24 | 44,120 |
| E2 | G, H | 1.55 | 1.94 | 30 | 37,170 |

Table 7 shows magnetic characteristic values of embodiments of a mixed CoFe/NiFe core.

The reference states RG-1 and RH-1 represent annealed individual rings made from the alloys.

Here, the VACODUR rings (RG-1) are subjected to final annealing for 6 h at 880° C. in dry hydrogen. It is possible using these parameters to produce VACODUR 49 with very good soft magnetic properties, i.e. high permeability $\mu_{max}$ of 22,060 and low coercive field strength $H_c$ of 31 A/m.

The PERMENORM rings (RH-1) are subjected to another final annealing process, i.e. 5 h at 1150° C. in dry hydrogen. This annealing process is very well suited to PERMENORM 5000 V5 and results in a very low coercive field strength of approx. 5 A/m.

The RG-2 and RH-2 states represent intermediate states following the method according to the invention.

In example RG-2, unannealed VACODUR rings are connected by means of laser welding to form segments. Each segment consists of 10 punched rings that are attached to one another. The segments are then annealed in the same manner as for reference RG-1 (6 h at 880° C., $H_2$).

In example RH-2, unannealed PERMENORM rings are attached by means of laser welding to form segments, each consisting of 10 punched rings. The segments are annealed in the same manner as for the reference RH-1 annealed (5 h at 1150° C., $H_2$).

In reference state R6, three annealed segments made of VACODUR 49 (state RG-2) and three annealed segments made of PERMENORM 5000 V5 (state RH-2) are stacked loose one on top of another. The different segments are stacked alternately, i.e. GHGHGH. As a result, the magnetic values measured represent the magnetic characteristics in the "mixed laminated core" and no damage has been caused by the adhesive bonding process.

States E1 and E2 represent states according to the invention.

In example E1, three annealed segments RG-2 and three annealed segments RH-2 are stacked alternately as for state R6. During the stacking process, three adhesive spots are applied to the top layer of each segment using the adhesive before the next segment, made of a different material, is pressed onto the segment below it. In total, six segments are adhesively bonded to one another in this manner, with only five top layers being connected to one another by means of adhesive spots.

In example E2, three annealed segments RG-2 and three annealed segments RH-2 are stacked alternately in the same manner as for state E1 and adhesively bonded to one another by the top layers. In contrast to E1, however, the adhesively is applied extensively rather than in spots.

The magnetic values for examples RG-2 and RH-2 are close to the reference values RG-1 and RH-1. Where the sheets are the same, therefore, the welding of sheets to form a segment with subsequent final annealing does not lead to significant deterioration.

Examples E1 and E2 show that adhesive bonding of the top layers results in only a minor deterioration in soft magnetic properties when compared to the stress-free mixed state R1. Induction B3 at 1.65 T and 1.55 T is close to the reference value of 1.71 T, as is maximum permeability $\mu_{max}$ at 44,120 and 37,170 when compared to the reference value of 40,000.

Figure 8:
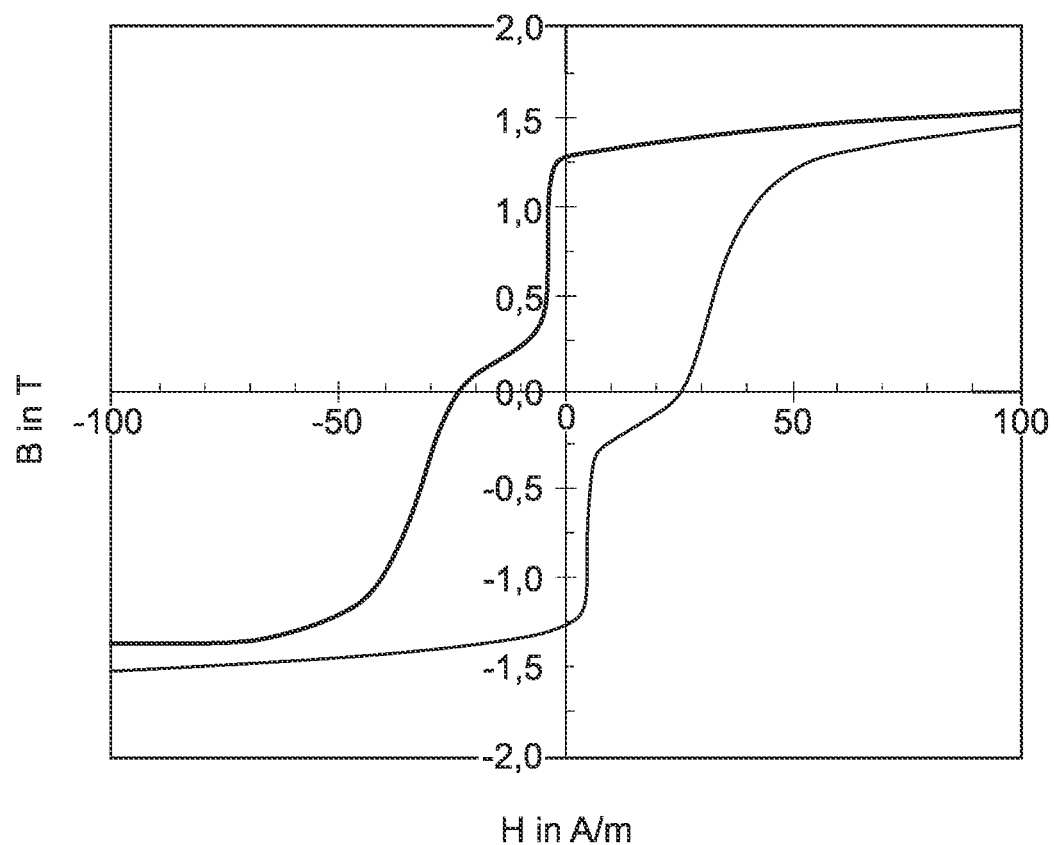
FIG. 8 shows a hysteresis loop of a laminated core having segments of different materials.

The examples show that with the structure of the laminated core according to the invention it is possible to clearly separate and calculate the characteristics of the two different materials. FIG. 8 shows the hysteresis loop of a laminated core with segments made of different materials that combines two different loop forms.

The invention claimed is:

1. A laminated core, comprising
   a plurality of segments,
   the segments each comprising a plurality of soft magnetic lamination sheets that are stacked one on top of another in a direction of stacking and attached to one another by means of a welded connection to form a segment,
   the lamination sheets of different segments being attached to one another by an adhesive connection only,
   each of the segments having end faces, these end faces of neighboring segments being attached to one another by the adhesive connection only to form the laminated core,
   the lamination sheets of at least one of the segments being formed of an FeSi alloy, and
   the lamination sheets of at least one of the segments being formed of a CoFe alloy.

2. The laminated core according to claim 1, wherein the welded connection has the form of one or more spots or one or more seams.

3. The laminated core according to claim 1, wherein the welded connection has the form of one or more spots or one or more seams that are arranged at edge sides of the lamination sheets.

4. The laminated core according to claim 1, wherein the adhesive connection comprises a plurality of adhesive spots.

5. The laminated core according to claim 1, wherein the adhesive connection extends over almost the entire boundary between the segments.

6. The laminated core according to claim 1, wherein the FeSi alloy is an FeSi-based alloy having 1 to 4.5 wt % of at least one element from the group consisting of Si and Al, the rest being Fe and unavoidable impurities.

7. The laminated core according to claim 1, wherein the CoFe alloy comprises
   35 to 55 wt % Co and up to 2.5 wt % V, the rest being Fe and unavoidable impurities, or
   45 wt %≤Co≤52 wt %, 45 wt %≤Fe≤52 wt %, 0.5 wt %≤V≤2.5 wt %, the rest being Fe and unavoidable impurities, or
   35 wt %≤Co≤55 wt %, 0 wt %≤Ni≤0.5 wt %, 0.5 wt %≤V≤2.5 wt %, the rest being Fe and unavoidable impurities, or 35 wt %≤Co≤55 wt %, 0 wt %≤V≤2.5 wt %, 0 wt %≤(Ta+2Nb)≤1 wt %, 0 wt %≤Zr≤1.5 wt %, 0 wt %≤Ni≤5 wt %, 0 wt %≤C≤0.5 wt %, 0 wt %≤Cr≤1 wt %, 0 wt %≤Mn≤1 wt %, 0 wt %≤Si≤1 wt %, 0 wt %≤Al≤1 wt %, 0 wt %≤B≤0.01 wt %, the rest being Fe and unavoidable impurities, or 5 to 25 wt % Co, 0.3 to 5.0 wt % V, 0 wt %≤Cr≤3.0 wt %, 0 wt %≤Si≤3.0 wt %, 0 wt %≤Mn≤3.0 wt %, 0 wt %≤Al≤3.0 wt %, 0 wt %≤Ta≤0.5 wt %, 0 wt %≤Ni≤0.5 wt %, 0 wt %≤Mo≤0.5 wt %, 0 wt %≤Cu≤0.2 wt %, 0 wt %≤Nb≤0.25 wt %, the rest being Fe and unavoidable impurities.

8. The laminated core according to claim 1, wherein the lamination sheets are electrically insulated from one another by an insulating layer.

9. An electric machine, comprising
a laminated core according to claim 1 that is configured as a stator or a rotor.

10. The laminated core of claim 1, wherein only the topmost and/or bottommost lamination sheets of a segment are attached by the adhesive connection to the end face of another segment, and the remainder of the lamination sheets of the segment are connected in the segment by the welded connection only.

11. The laminated core of claim 1, wherein the lamination sheets may be formed of different soft magnetic alloys, and within the segments all of the laminations sheets are formed of the same soft magnetic alloy.

* * * * *